(12) United States Patent
Chuang

(10) Patent No.: US 6,799,400 B2
(45) Date of Patent: Oct. 5, 2004

(54) EARTHQUAKE SHOCK DAMPER

(76) Inventor: Kuo-Jung Chuang, No. 25-1, Lane 62, Sec. 2, Chinan Rd., Taipei (TW)

(*) Notice: Subject to any disclaimer, the term of this patent is extended or adjusted under 35 U.S.C. 154(b) by 0 days.

(21) Appl. No.: 10/342,262

(22) Filed: Jan. 15, 2003

(65) Prior Publication Data
US 2004/0135056 A1 Jul. 15, 2004

(51) Int. Cl.$^7$ .............................. E04B 1/98; E04H 9/02
(52) U.S. Cl. ................... 52/167.1; 52/167.7; 52/167.8; 52/167.4; 188/371; 188/372; 188/377; 188/379
(58) Field of Search ........................... 52/167.1, 167.4, 52/167.7, 167.8, 1; 188/371, 372, 377, 379; 267/292, 69, 73, 139, 140

(56) References Cited

U.S. PATENT DOCUMENTS 4,823,522 A * 4/1989 White ...................... 52/167.7

* cited by examiner

Primary Examiner—Rodney B. White
(74) Attorney, Agent, or Firm—Fei-Fei Chao; Venable LLP

(57) ABSTRACT

An earthquake shock damper includes two positioning plates, two fixing plates and multiple energy absorbing plates securely sandwiched between the two positioning plates and having the two fixing plates extending out in different directions. Each energy absorbing plate has a mediate portion with a width smaller than that of two distal ends of the energy absorbing plate so that deformation of the energy absorbing plate is able to smoothly absorb energy from the earthquake.

4 Claims, 9 Drawing Sheets

EARTHQUAKE SHOCK DAMPER

BACKGROUND OF THE INVENTION

1. Field of the Invention

The present invention relates to an earthquake shock damper, and more particularly to an earthquake shock damper to absorb energy from earthquake.

2. Description of Related Art

A conventional earthquake shock damper normally is able to effectively absorb energy from axial direction with respect to the damper. However, when there is a force coming from a radial direction relative to the damper, the effectiveness of the damper is greatly reduced.

To cope with the ineffectiveness of the conventional earthquake shock damper, an oil damper is introduced to the market. Although the oil damper works very well when encountering an earthquake, high cost and extreme professional construction requirement make the oil damper not so popular with users. Furthermore, the effectiveness of the oil damper is easily impaired by the surrounding moisture and temperature.

To overcome the shortcomings, the present invention tends to provide an improved earthquake shock damper to mitigate and obviate the aforementioned problems.

SUMMARY OF THE INVENTION

The primary objective of the present invention is to provide an improved earthquake shock damper to effectively absorb energy from earthquakes so that buildings are protected from damage.

In order to accomplish the foregoing objective, the earthquake shock damper of the present invention has two positioning plates, two fixing plates and multiple energy absorbing plates securely sandwiched between the two positioning plates. Each of the two fixing plates oppositely-extends from a side of the combination of the two positioning plates and the energy absorbing plates to adapt to connect to side walls of a foundation. Therefore, when there is an earthquake, the deformation of the energy absorbing plates absorbs most of the energy from the earthquake so that damage to the building is minimized.

Other objects, advantages and novel features of the invention will become more apparent from the following detailed description when taken in conjunction with the accompanying drawings.

DETAILED DESCRIPTION OF THE PREFERRED EMBODIMENT

Figure 1:
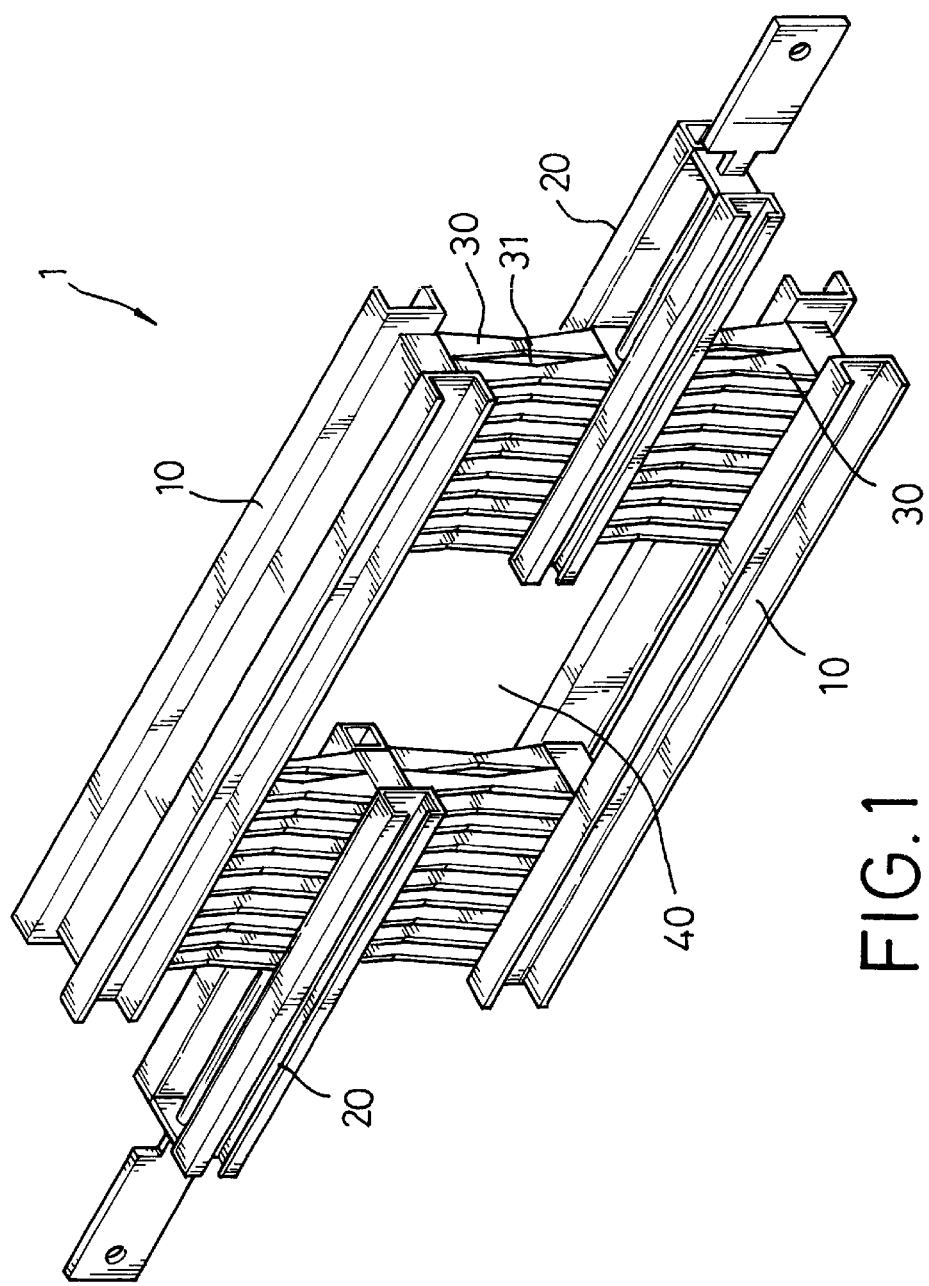
FIG. 1 is a perspective view of the earthquake shock damper of the present invention.

With reference to FIG. 1, the earthquake shock damper (1) in accordance with the present invention includes two positioning plates (10), two fixing plates (20) and multiple energy absorbing plates (30) securely sandwiched between the two positioning plates (10).

The two positioning plates (10) are parallel with respect to each other and are made of steel to become rigid objects.

The energy absorbing plate (30) is made of steel with low strength but high elasticity. The energy absorbing plate (30) is securely sandwiched between the two paralleled positioning plates (10). Each energy absorbing plate (30) is tapered toward the center of the energy absorbing plate (30) so that two distal ends of the energy absorbing plate (30) have a width, and a intermediate portion of the energy absorbing plate (30) has a width smaller than that of the two distal ends of the energy absorbing plate (30). It is noted from the drawing that multiple pairs of energy absorbing plates (30) are securely connected to one another via the two fixing plates (20) each extending in a different direction relative to one another. Therefore, after the earthquake shock damper of the present invention is assembled, a first group of energy absorbing plates (30), which are in pairs, is securely engaged with one of the two fixing plates (20) and a second group of energy absorbing plates (30), which also in pairs, is securely engaged with the other one of the two fixing plates (20). A rectangular through hole (31) is thus defined in the pairs of energy absorbing plates (30). A gap (40) is defined between the two groups of energy absorbing plates (30).

Figure 2B:
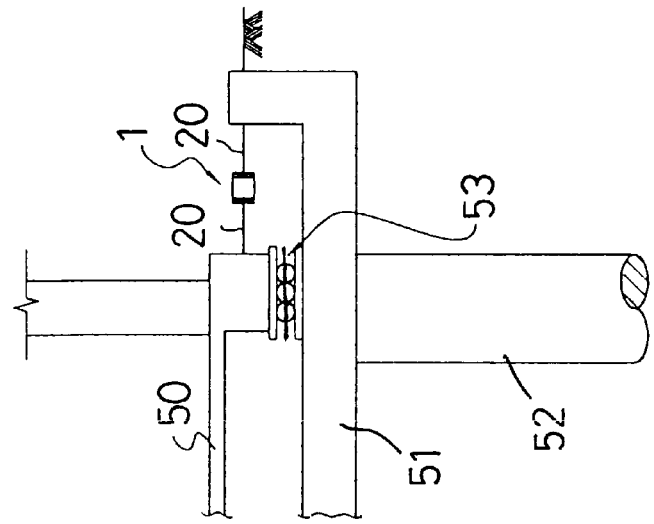
FIG. 2B is a schematic view showing the application of the earthquake shock damper to the building.
Figure 2A:
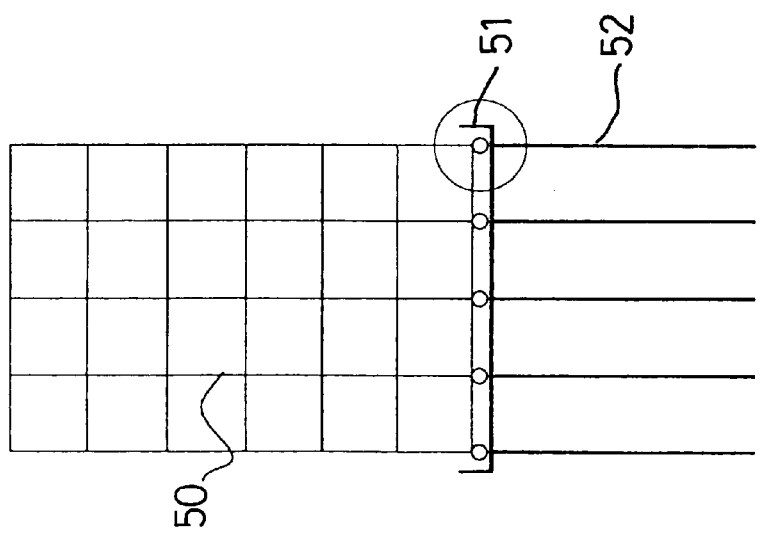
FIG. 2A is a schematic view showing a relationship between a building and stubs.

With reference to FIGS. 2A and 2B, when a building (50) built on a foundation (51) and provided with stubs (52) is applied with the earthquake shock damper (1), the earthquake shock damper (1) is securely connected between an outer surface of the building (50) and an outer surface of the foundation (51). Normally, a pad (53) with balls (not labeled) is provided between a bottom surface of the building (50) and a top surface of the foundation (51) to provide sliding resistance to the building (50) should there be an earthquake to move the building (50) sideways. The earthquake shock damper of the present invention is securely connected to outer surfaces of the building (50) and the foundation (51) via free ends of the two fixing plates (20).

Figure 3:
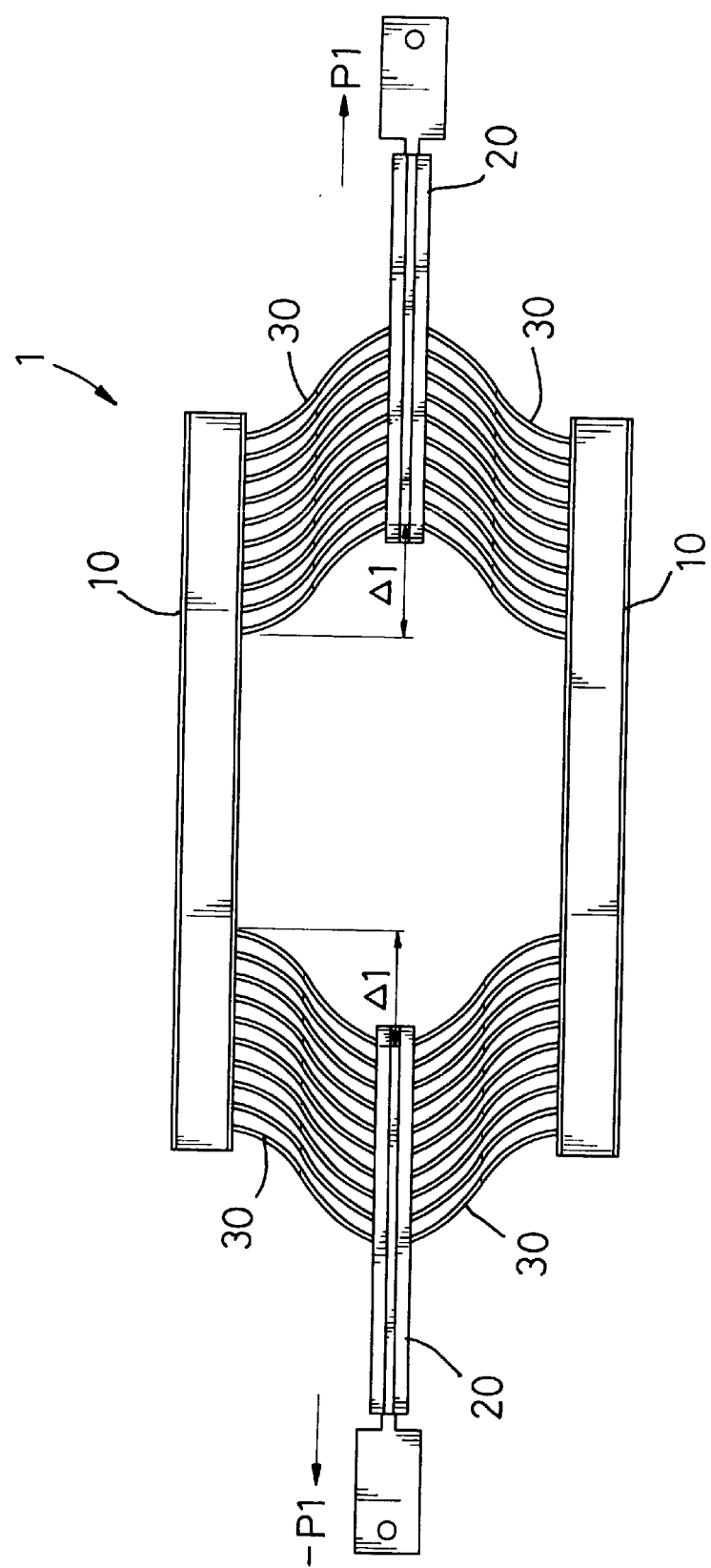
FIG. 3 is a schematic view showing a deformation of the energy absorbing plates due to a force acting on the energy absorbing plates.
Figure 4:
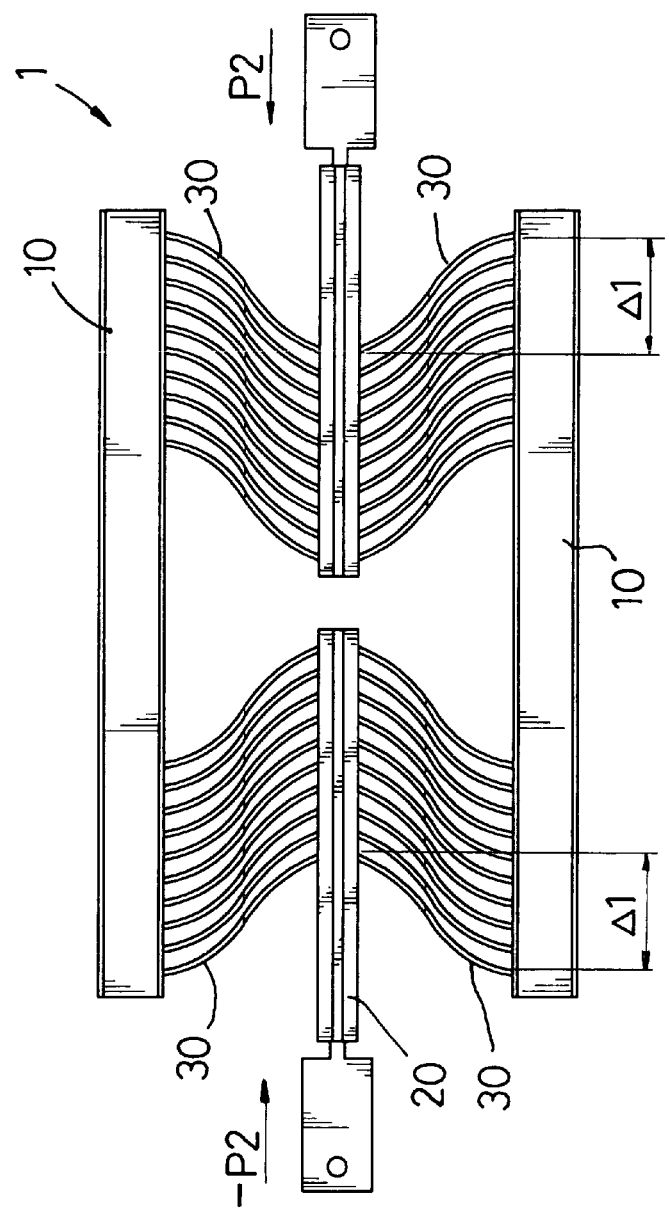
FIG. 4 is a schematic view showing a deformation of the energy absorbing plates due to a force coming from a direction opposite to that of the force in FIG. 3.

With reference to FIGS. 3 and 4, when there is an earthquake causing the foundation (51) and the building (50) to move laterally, the deformation of the pairs of the energy absorbing plates (30) is able to compensate the vibration of the earthquake. Thus, if a force (P1) is acting on the outer surface of the foundation (51) and a negative force (−P1) is acting on the outer surface of the building (50) and respectively causing the pairs of energy absorbing plates (30) to displace by 1, as shown in FIG. 3, the deformation of the pairs of energy absorbing plates (30) into different directions compensates the shock energy of the earthquake. If a force (P2) is acting on the outer surface of the foundation (51) and a negative force (-P2) is acting on the outer surface of the building (50) and respectively causing the pairs of energy absorbing plates (30) to displace by 1, as shown in FIG. 4, the deformation of the pairs of energy absorbing plates (30) into different directions compensates the shock energy of the earthquake.

Figure 5:
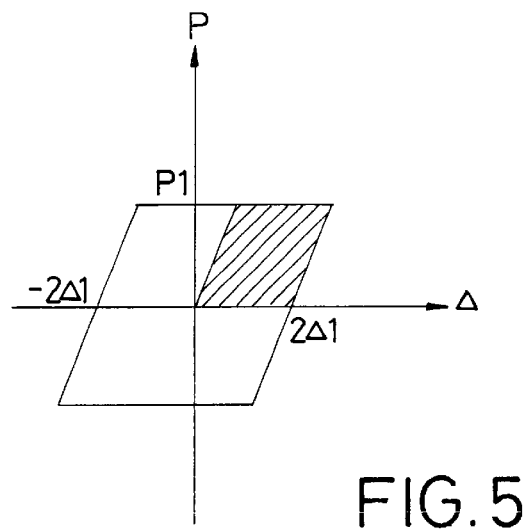
FIG. 5 is a schematic view showing an ideal energy consumption when a force P1 acts on an object to make the object to have a displacement.

With reference to FIG. 5, an ideal energy consumption view is shown when a force P is acting on an object and causes the object to have a displacement of 21, the hatched area shows the energy consumed.

Figure 6:
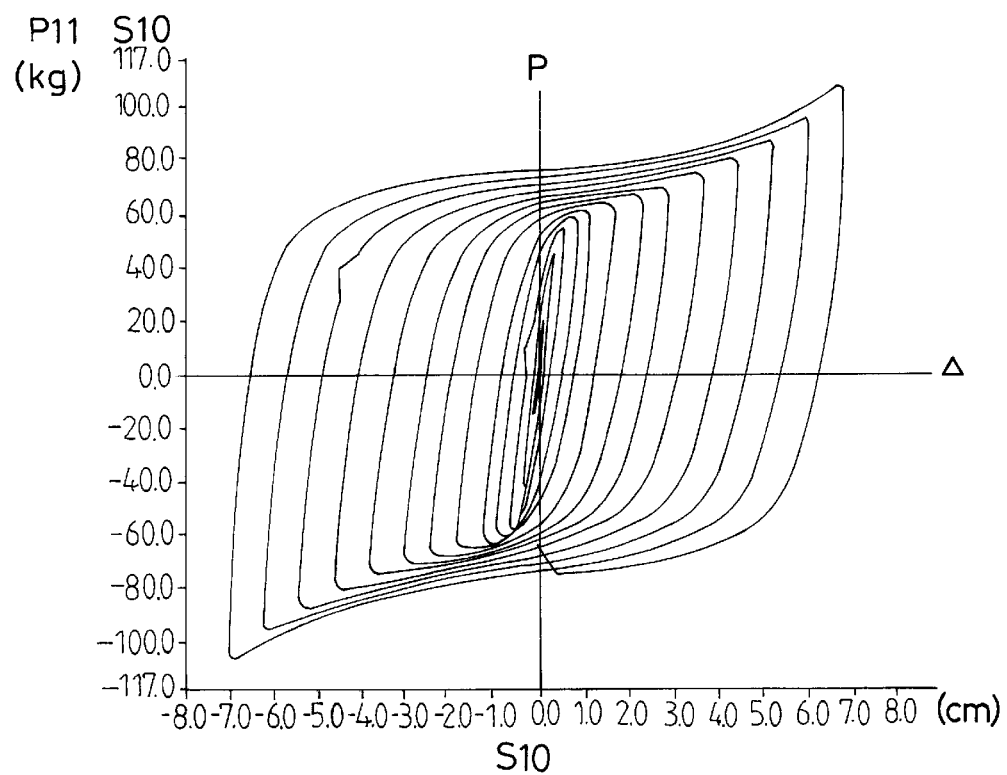
FIG. 6 is a schematic view showing the practical energy consumption when a force P1 acts on an object to make the object to have a displacement.

With reference to FIG. 6, when the earthquake shock damper (1) of the present invention is put to test, the energy consumed curve is smooth, which shows that the earthquake shock damper (1) is able to absorb energy from the earthquake easily and smoothly, wherein the x-coordinate is the relative displacement of the two free ends of the two fixing plates (20) and the y-coordinate represents the magnitude of the force acting on the earthquake shock damper.

Figure 7:
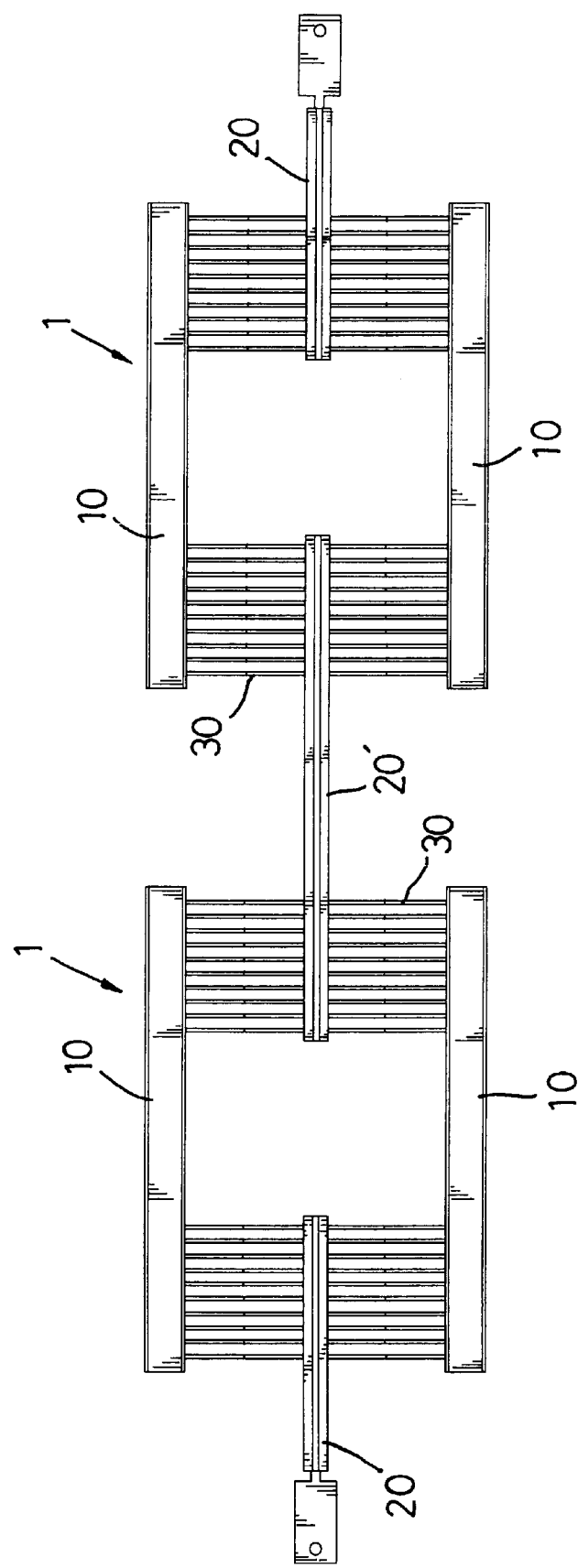
FIG. 7 is a plan view showing that two sets of earthquake shock dampers are connected in series.
Figure 8:
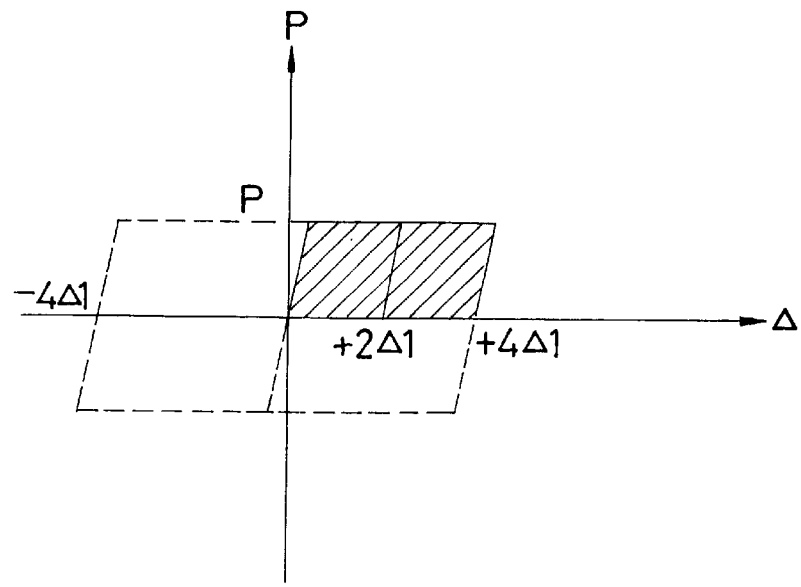
FIG. 8 is a schematic view showing the energy consumption by two earthquake shock dampers in series.

With reference to FIG. 7, in order to increase the strength of the earthquake shock damper (1) of the present invention, two sets of the earthquake shock dampers (1) are connected to one another via a connector (20') which connects the first group of pairs of energy absorbing plates (30) of one earthquake shock damper (1) to the second group of pairs of energy absorbing plates (30) of another earthquake shock damper (1). Thereby the connection between two earthquake shock dampers (1) in series doubles the energy consumption for deformation, as shown in FIG. 8.

Figure 10:
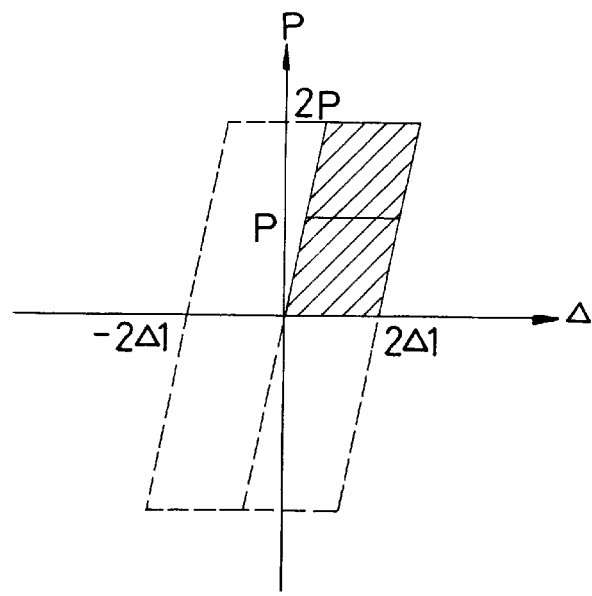
FIG. 10 is a schematic view showing the energy consumption by two earthquake shock dampers in parallel.
Figure 9:
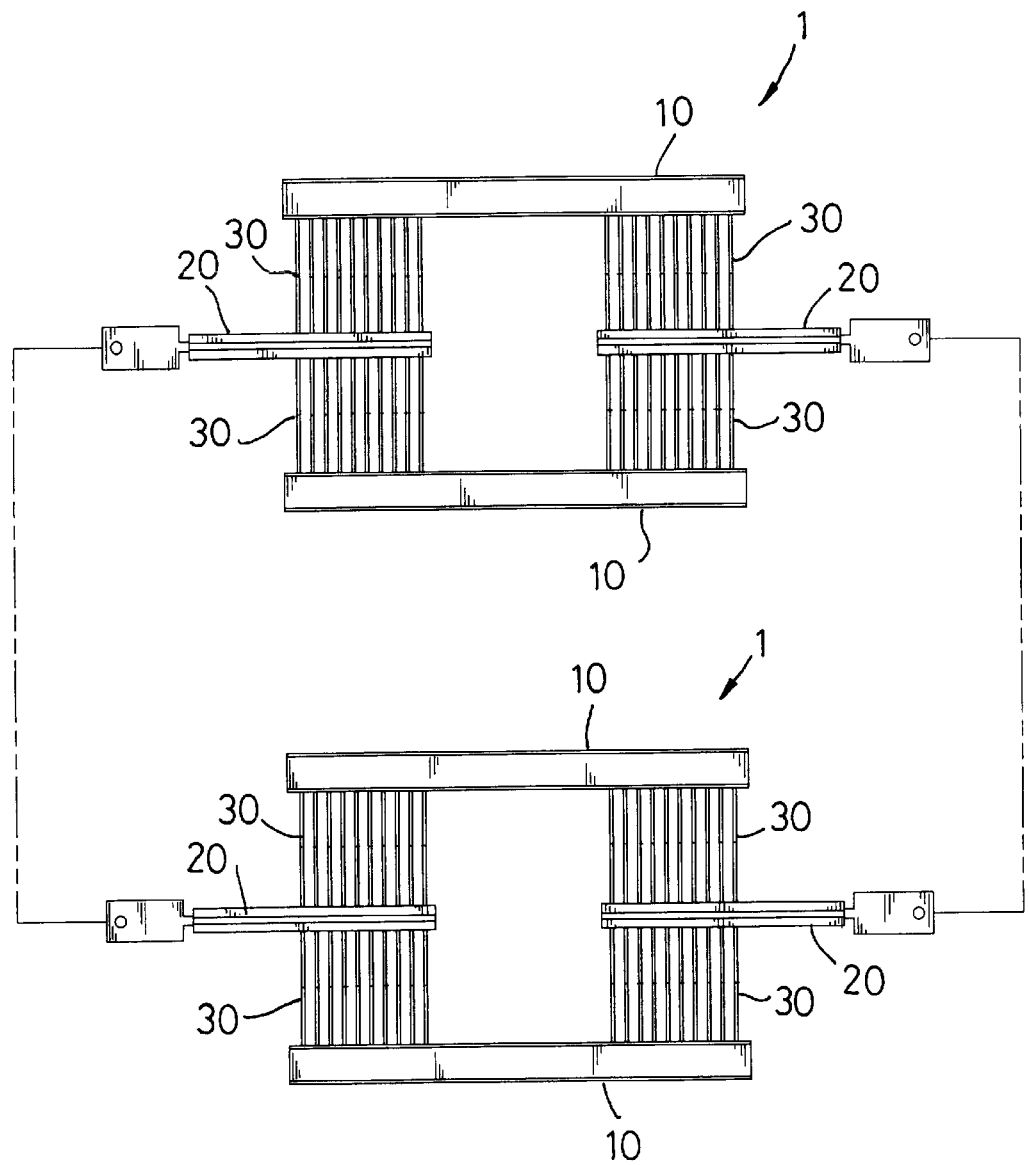
FIG. 9 is plan view showing that two sets of earthquake shock dampers are connected parallel.

With reference to FIG. 9, another way of increasing the strength of the earthquake shock damper (1) is to combine two sets of earthquake shock dampers (1) in parallel. As a consequence of the parallel combination of two earthquake shock dampers (1), the displacements of the combination is reduced, as shown in FIG. 10. Therefore, the operator is able to choose to use parallel combination or in-series combination of two earthquake shock dampers (1) depending on the surrounding situations.

Figure 11:
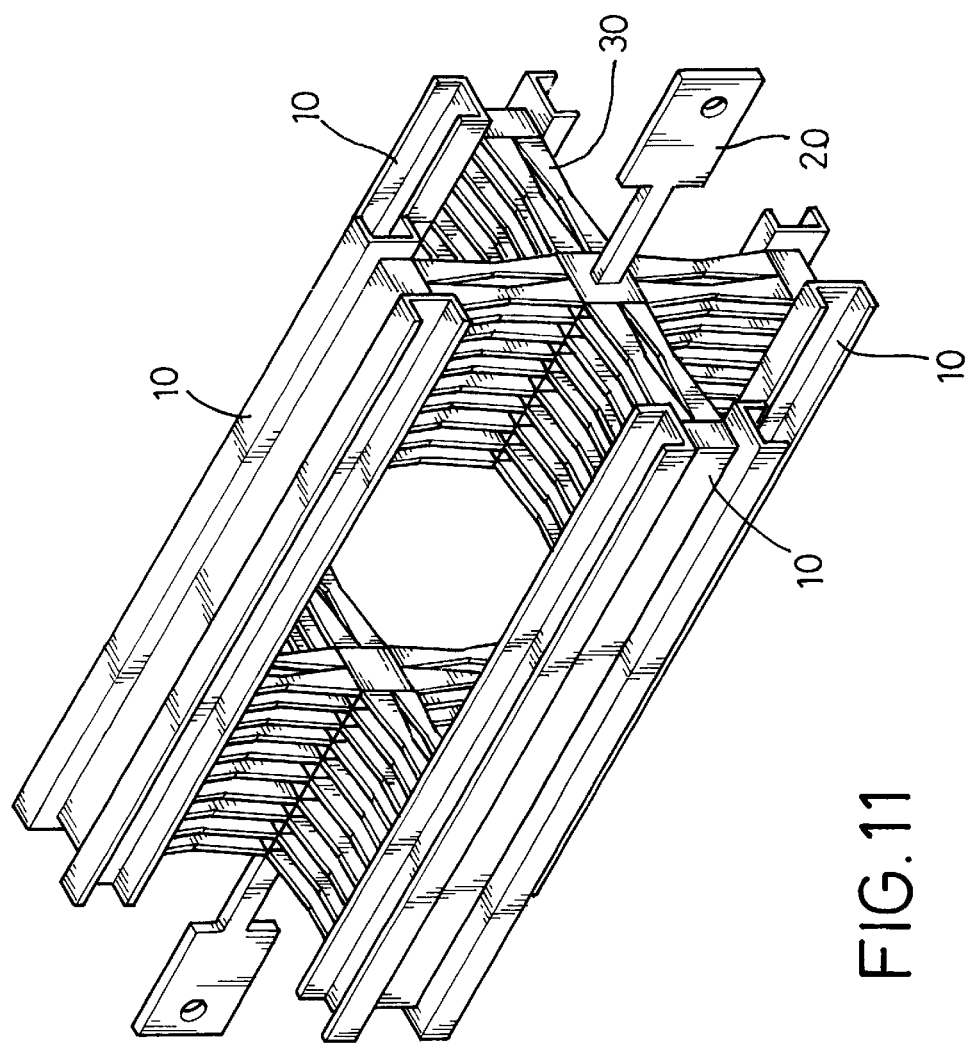
FIG. 11 is a perspective view of another embodiment of the present invention.

With reference to FIG. 11, alternative embodiment of the present invention is shown to have two more positioning plates (10) each securely mounted on a lateral portion of the multiple pairs of the energy absorbing plates (30).

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An earthquake shock damper comprising:

two positioning plates parallel with respect to each other;

multiple pairs of energy absorbing plates each securely sandwiched between the two parallel positioning plates, and two fixing plates, wherein one fixing plate securely engages with one group of the multiple pairs of energy absorbing plates adapted to securely engage with an outer surface of a foundation and the other one of the fixing plates securely engages with the other group of the multiple pairs of energy absorbing plates adapted to securely engage with an outer surface of a building so as to define a gap between the two groups of pairs of energy absorbing plates, wherein each energy absorbing plate has an intermediate portion with a width smaller than that of two distal ends of the energy absorbing plate so as to absorb energy from an earthquake smoothly.

2. The earthquake shock damper as claimed in claim 1 further comprising:

two second positioning plates parallel with respect to each other;

multiple second pairs of energy absorbing plates each securely sandwiched between the two second parallel positioning plates;

two second fixing plates, wherein one second fixing plate securely engages with one group of the multiple second pairs of energy absorbing plates and the other one of the second fixing plates securely engages with the other group of the multiple second pairs of energy absorbing plates so as to define a second gap between the two groups of second pairs of energy absorbing plates; and a connector provided to securely connect a group of the pairs of energy absorbing plates to a second group of the second pairs of energy absorbing plates to connect each other in series so as to increase strength to minimize the shock of an earthquake.

3. The earthquake shock damper as claimed in claim 1, wherein a gap is defined between two groups of energy absorbing plates.

4. The earthquake shock damper as claimed in claim 3, wherein a rectangular through hole is defined in the pairs of energy absorbing plates.

* * * * *